United States Patent Office 3,545,082
Patented Dec. 8, 1970

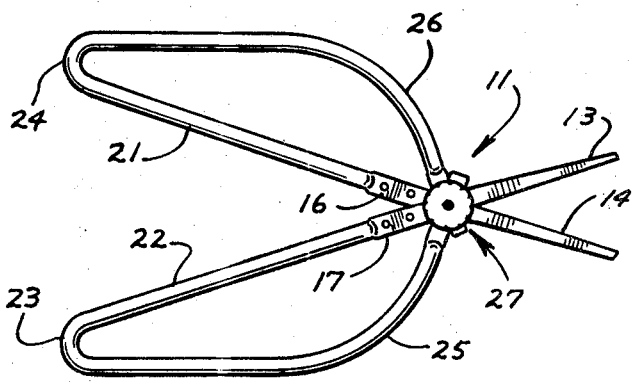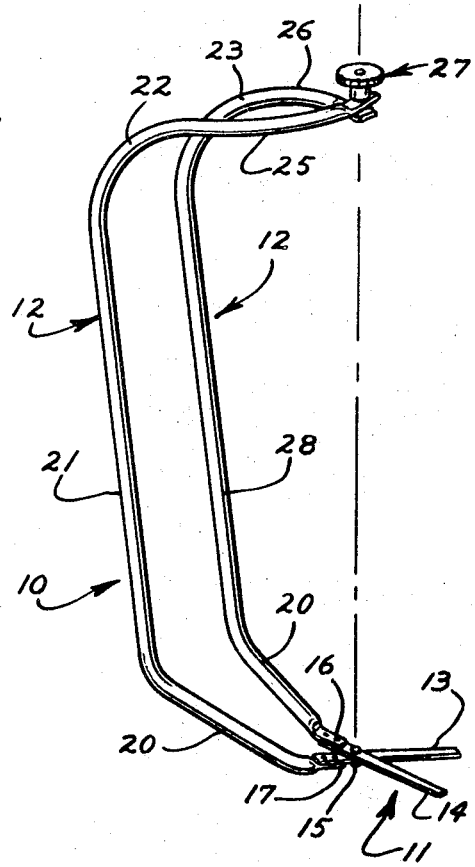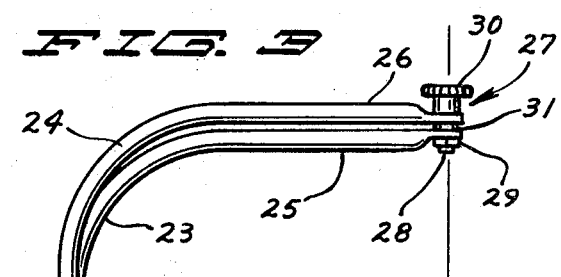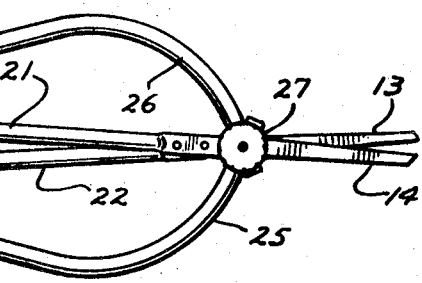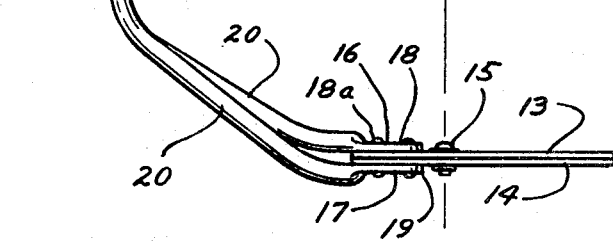

3,545,082
TRIMMING SHEARS WITH OPERATING HANDLE
Richard M. Lehtonen, 942 Edmund Ave.,
St. Paul, Minn. 55104
Filed June 5, 1968, Ser. No. 734,794
Int. Cl. B26b 13/12
U.S. Cl. 30—248
1 Claim

ABSTRACT OF THE DISCLOSURE

This invention relates to shears for trimming grasses and the like and includes a pair of generally long upstanding handle members extending upwardly and rearwardly from the cutting portions of the shears to an approximate waist high position and then forwardly to a common pivot and connection point for the handles. This pivot point and connection point is generally in alignment vertical above the pivot point for the shearing blade connection. The upstanding handles permit the shears to be operated while the operator is in a standing position and the pivotal connection between the handles permits the opening and closing of the shear cutting blades from this waist high operative position.

---

In the past various long handles trimming shears and the like have been provided for trimming grasses, trees and the like. Applicant has provided herein a shear construction which includes a pair of generally long, upstanding and rearwardly directed handle members which will extend approximately to a waist high position of the operator using the shears. This handle location will permit the use of the shears while the operator is in a standing position and the unit is so designed to permit complete control of the cutting blades of the shears from this position by providing a unique handle connecting and pivoting motion at the junction of the handles.

It is therefore an object of applicant's device to provide a cutting shears having a pair of elongated rearwardly and upwardly extending handles designed to permit the use of the shears while the operator is in a standing position.

It is a further object of applicant's invention to provide a handle portion for cutting shears or the like which provide a pivotal connection at the junction of the handles to permit opening and closing thereof whereby the blade portions located at the other ends of the handles will likewise be opened and closed for cutting.

It is a further object of applicant's invention to provide a trimming shears or the like which include particularly designed handle members arranged and constructed to permit the control of the shearing blades from a relatively remote location.

These and other objects and advantages of my invention will more fully appear from the following description made in connection with the accompanying drawings, wherein like reference characters refer to the same or similar parts throughout the several views, and in which:

FIG. 1 is a perspective view of the trimming shears embodying the concepts of applicant's invention;

FIG. 2 is a top plan view of the shears illustrated with the blades in an open position;

FIG. 3 is a side elevation of the shears; and

FIG. 4 is a top plan view illustrating the shears in a relatively closed position.

In accordance with the accompanying drawings the cutting device embodying the concepts of applicant's invention is generally designated 10 and includes a blade and cutting section 11 at the lower end thereof with a pair of upstanding handles 12—12 attached to the rear of the blades and extending upwardly and rearwardly therefrom.

The cutting section 11 includes a pair of overlying blade members 13–14 arranged in what may be termed normal fashion having a pivot point 15 intermediate the ends thereof with connecting portions 16–17 arranged rearwardly of the pivot point 15.

The handle members 12—12 are in the form shown provided with an attachment end 18–19 for attachment to the rearwardly ends 16–17 of the blades and in the form shown are attached thereto with rivots 18a or the like. This attachment end 18–19 of the handles 12—12 is in the form shown flattened to permit positive and proper attachment on respective sides of the blades 16–17. In the form shown, particularly in FIG. 3 the handles 12—12 are provided with an upwardly and rearwardly extending portion 20—20 extending to a generally vertically arranged portion 21–22. This vertically arranged portion is designed to be of sufficient length to have the upper end thereof at approximately an average waist height. The upper end of the generally vertically arranged members 21–22 is provided with a forwardly directed radius 23–24 which terminates in a generally horizontally arranged forward connective end 25–26. The forwardmost ends of this horizontal portion 25–26 are again partially flattened to permit the joinder thereof through a pivotal connecting member generally designated 27.

The pivotal connecting member includes a bolt 28, a nut 29 and a handle member 30 on the bolt 28 for tightening the ends of the handle portions 25–26 together. A spacing washer 31 or the like may be provided on the bolt portion 28 intermediate the handle portions 25–26 to permit smooth rotation of the handles 12—12 about the bolt 28.

As illustrated by the dotted center line in FIGS. 1 and 3 the upper pivot point of the connected handles is in generally vertically overlying relationship with respect to the lower pivot member 15 connecting the blade 13–14.

As illustrated in FIGS. 2 and 4 the generally horizontal portions 25–26 of the handles converge inwardly to the pivotal connection 27. This inward convergence is necessary to permit the actual operative portion which will be and has been found to be the radius portions 23–24 of the handles to be properly spaced for proper operation of the device.

In the form shown the handle members 12—12 obviously are designed to position the operative portions thereof at a reasonable height above ground level. The upward bending configuration of the handle portion 12 is designed such that the feet of the user may be relatively close to the blades. This positioning is provided by the upward and rearwardly directed portion 20 of the handles 12.

Obviously in use of the shears as illustrated herein the handles are opened and closed much as the standard handles on any shears are opened and closed. The advantages with this particular configuration, however, are the placement of the handles at proper level and the utilization of clearance angles in the handles near the blade portion. The length of the handles is designed to permit proper ground usage as well as sufficient height for overhead usage.

It should be obvious that applicant has provided a new and unique shear unit which includes a pair of elongated handle members and which through the utilization of a double back bend at the upper portion of the handles permits pivotal connection of the handles and therefore a connected integral unit. This is to say that if the handles were simply directed upwardly and rearwardly they would not be in position to properly open and close the shearing blades as they would obviously tend to bend the distort when pressure was applied thereto. The connection device permits their opening and closing and rotation about the established center line and therefore properly provides control for the blade portions thereof.

What is claimed is:
1. A cutting device including:
   (a) a pair of pivotally connected cut-blades having a cutting end and a connective end with the pivotal connection therebetween;
   (b) a pair of generally rearwardly and upwardly directed handle members connected respectively to the connective ends of said blades;
   (c) said handles being pivotally joined at their upper ends whereby opening and closing of said handles will open and close said blades; and,
   (d) the lower portion of said handles adjacent the blade connective portion thereof arranged angularly upward to provide when said blades are in generally horizontal relation against a surface a clearance angle directly behind the blades permitting a user to stand relatively close to the blades.

References Cited

UNITED STATES PATENTS

| | | | |
|---|---|---|---|
| 2,984,907 | 5/1961 | Schmidt | 30—248 |
| 3,438,130 | 4/1969 | Ballard | 30—248X |

ROBERT C. RIORDON, Primary Examiner

J. C. PETERS, Assistant Examiner

U.S. Cl. X.R.

30—257